(12) United States Patent
Lewis et al.

(10) Patent No.: US 6,419,384 B1
(45) Date of Patent: Jul. 16, 2002

(54) DRINKING VESSEL WITH INDICATOR ACTIVATED BY INERTIAL SWITCH

(76) Inventors: Edward D. Lewis, 741 Mikal La., Brownsburg, IN (US) 46112; Raymond W. Leung, 45218 Pawnee Dr., Fremont, CA (US) 94539

( * ) Notice: Subject to any disclaimer, the term of this patent is extended or adjusted under 35 U.S.C. 154(b) by 0 days.

(21) Appl. No.: 09/534,797

(22) Filed: Mar. 24, 2000

(51) Int. Cl.⁷ .............................................. A01K 63/06
(52) U.S. Cl. ........................ 362/562; 362/101; 362/96; 362/276; 362/318; 362/802; 200/61.45 R
(58) Field of Search ................................ 362/562, 101, 362/96, 276, 802, 318; 200/61.45 R, 61.48, 61.49, 61.51

(56) References Cited

U.S. PATENT DOCUMENTS

| | | | |
|---|---|---|---|
| 2,224,319 A | 12/1940 | Schroyer | 240/6.4 |
| 2,604,579 A | 7/1952 | Deneboudes | 240/2 |
| 2,663,866 A | 12/1953 | Simpson | 340/282 |
| 3,735,113 A | 5/1973 | Stott | 240/6.4 |
| 4,176,340 A | 11/1979 | Steinmeier | 340/52 H |
| 4,201,898 A | 5/1980 | Jones et al. | 200/61.45 R |
| 4,344,113 A * | 8/1982 | Ditto et al. | 362/101 |
| 4,357,510 A | 11/1982 | Fortuna | 200/283 |
| 4,390,928 A | 6/1983 | Runge | 362/101 |
| 4,581,507 A | 4/1986 | Bai et al. | 200/61.45 R |
| 4,607,747 A | 8/1986 | Steiner | 206/232 |
| 4,922,355 A | 5/1990 | Dietz et al. | 362/101 |
| 4,995,294 A | 2/1991 | Kashio et al. | 84/738 |
| 5,070,435 A | 12/1991 | Weller | 362/101 |
| 5,119,279 A | 6/1992 | Makowsky | 362/101 |
| 5,211,699 A | 5/1993 | Tipton | 362/101 |
| 5,258,591 A | 11/1993 | Buck | 200/181 |
| 5,309,141 A | 5/1994 | Mason et al. | 340/467 |
| 5,339,548 A | 8/1994 | Russell | 40/324 |
| 5,373,426 A | 12/1994 | O'Sullivan | 362/83.3 |
| 5,456,032 A | 10/1995 | Matsumoto et al. | 40/636 |
| 5,504,663 A | 4/1996 | Tucker | 362/101 |
| 5,550,721 A | 8/1996 | Rapisarda | 362/205 |
| 5,772,065 A | 6/1998 | Kalamaras | 220/612 |
| 5,786,553 A * | 7/1998 | Zakutin | 200/61.48 |
| 5,789,716 A | 8/1998 | Wang | 200/61.45 R |
| 6,104,306 A | 8/2000 | Hogue et al. | 340/686.1 |

* cited by examiner

Primary Examiner—Sandra O'Shea
Assistant Examiner—Bertrand Zeade
(74) Attorney, Agent, or Firm—William F. Bahret

(57) ABSTRACT

A shot glass with flashing light source or sound source activated by a low-profile, direction-sensitive inertial switch having a cantilevered coil spring contact. The shot glass has a body and a two-part hollow base, the base having upper and lower walls and a side wall together defining a compartment for an impact-responsive indicator circuit including the inertial switch, an LED or speaker, and a signal generator circuit responsive to the inertial switch, an LED or speaker. The inertial switch is a caseless switch consisting of a stationary contact and a cantilevered coil spring contact both mounted directly to a surface of a printed circuit board. The coil spring is preferably suspended over the stationary contact such that the switch is most sensitive to force applied axially to the bottom of the shot glass, and the longitudinal axis of the coil spring is preferably perpendicular to the longitudinal axis of the shot glass.

15 Claims, 3 Drawing Sheets

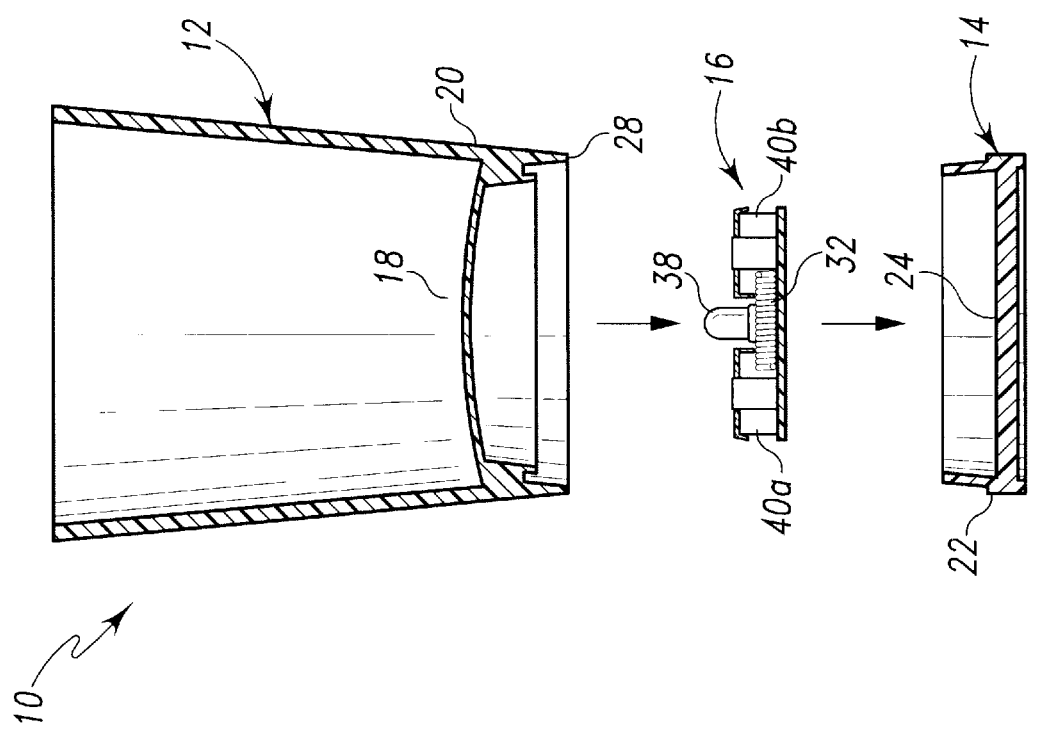
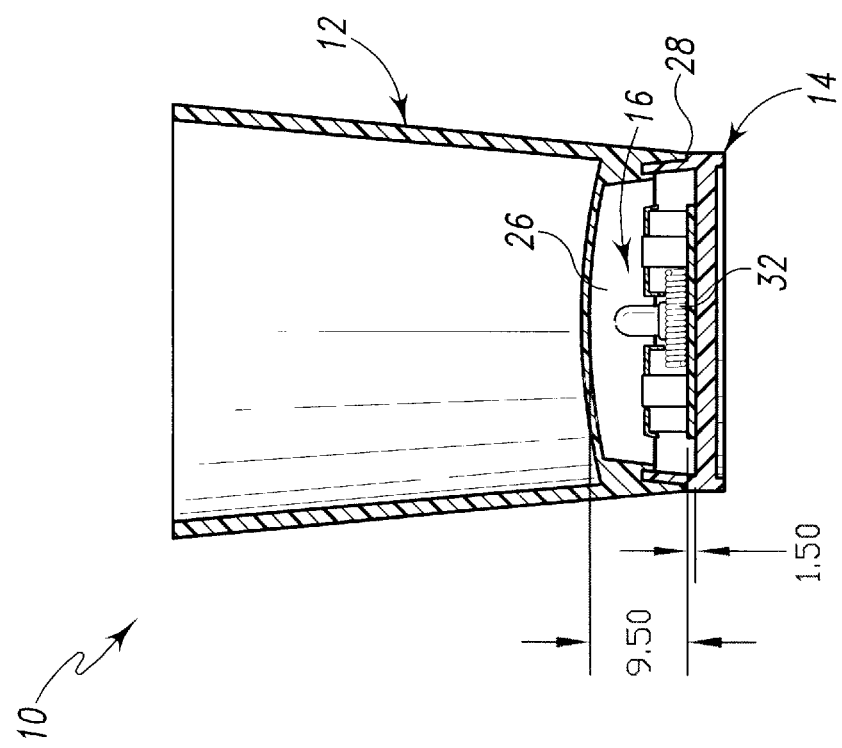

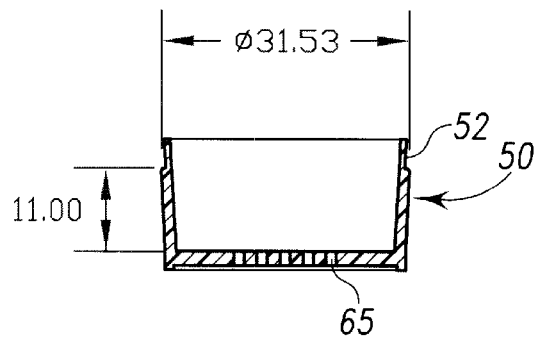
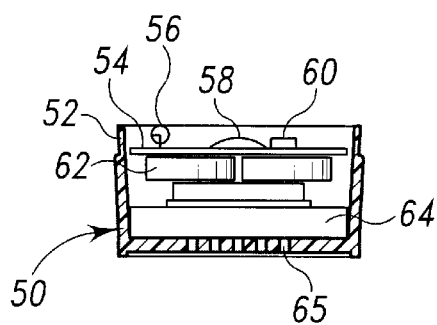
Fig. 6      Fig. 7
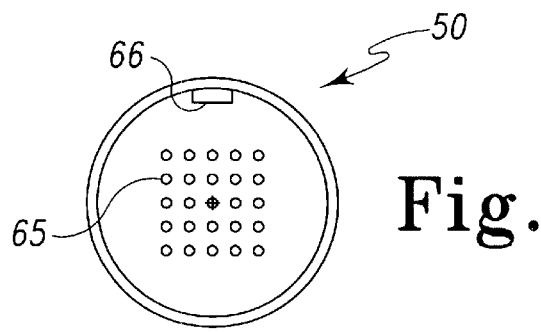
Fig. 8
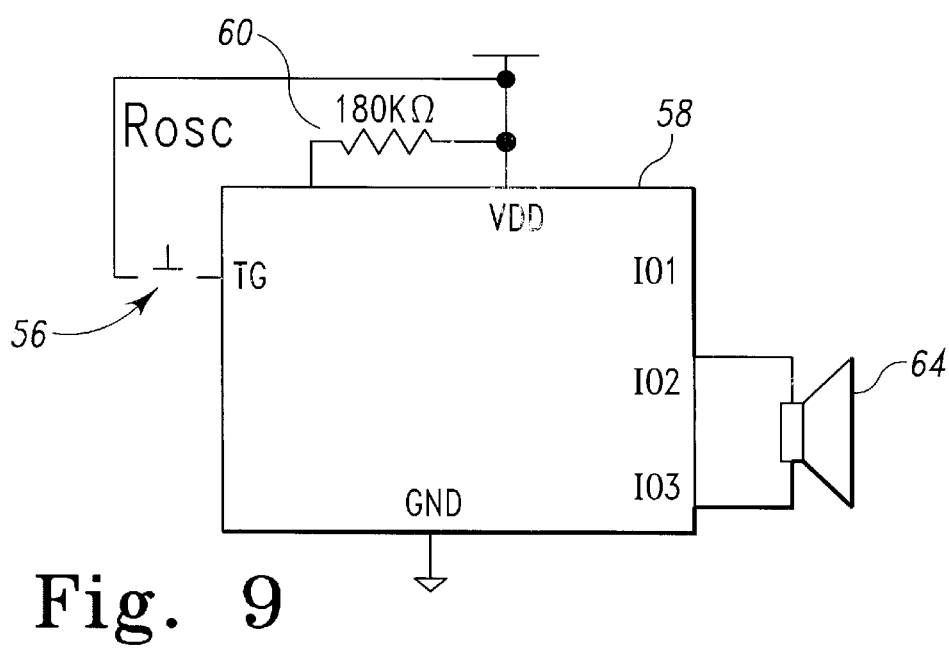
Fig. 9

DRINKING VESSEL WITH INDICATOR ACTIVATED BY INERTIAL SWITCH

BACKGROUND OF THE INVENTION

This invention relates to drinking vessels, and particularly to drinking vessels having an automatically activated indicator such as a light source or sound source.

Illuminated drinking vessels have been an object of interest for more than fifty years, as exemplified by the following patents:

| Patent No. | Inventor | Issue Date |
| --- | --- | --- |
| 2,224,319 | Schroyer | Dec. 10, 1940 |
| 2,663,866 | Simpson | Aug. 23, 1951 |
| 4,390,928 | Runge | Jun. 28, 1983 |
| 4,922,355 | Dietz et al. | May 1, 1990 |
| 5,070,435 | Weller | Dec. 3, 1991 |
| 5,119,279 | Makowsky | Jun. 2, 1992 |
| 5,211,699 | Tipton | May 18, 1993 |
| 5,339,548 | Russell | Aug. 23, 1994 |
| 5,504,663 | Tucker | Apr. 2, 1996 |

Illumination is controlled in a number of different ways in the devices disclosed in these patents, such as with a plunger-activated switch in the above-referenced patent to Schroyer, tilt switches with conductive balls or mercury beads as in the Simpson, Runge, Tipton and Russell patents, manually operated switches as in the Weller, Makowsky and Tucker patents, a moisture sensor as in the Dietz et al. patent, and liquid level detectors as, in the Simpson and Russell patents. Runge also discloses an embodiment of a tilt switch that includes a pendulum mounted vertically within a drinking vessel.

Numerous types of switches are, of course, available in other applications. Inertial switches, i.e., switches designed to change state in response to acceleration, have long been available in various forms in other applications, both military and commercial, and several examples thereof are disclosed in the following patents:

| Patent No. | Inventor | Issue Date |
| --- | --- | --- |
| 4,201,898 | Jones et al. | May 6, 1980 |
| 4,995,294 | Kashio et al. | Feb. 26, 1991 |
| 5,456,032 | Matsumoto et al. | Oct. 10, 1995 |
| 5,550,721 | Rapisarda | Aug. 27, 1996 |
| 5,786,553 | Zakutin | Jul. 28, 1998 |
| 5,789,716 | Wang | Aug. 4, 1998 |

It is also known to employ a piezoelectric sensor in the base of a drinking vessel for automatic activation of an LED or a sound module. A double-walled tumbler of the type described in copending U.S. patent application Ser. No. 08/730,597, hereby incorporated by reference, has been on the market for several years and has achieved commercial success. A shot glass containing the same type of circuit has also been on the market for more than a year, the circuit being contained in the base of a two-part molded shot glass of the type shown in U.S. Pat. No. 5,772,065 to Kalamaras. The piezoelectric sensor employed in the products just mentioned is wafer-thin and thus particularly suitable for a confined space such as in the base of a drinking vessel as small as a shot glass. The piezoelectric sensor has other advantages as well. However, problems have been experienced which are believed to be due, at least in part, to the piezoelectric sensor.

In spite of the existence of numerous types of drinking vessels with automatically activated light or sound sources, and the availability of numerous switch types, there is a continuing need for improved products of this type, and, more particularly, a continuing need for an improved combination of product attributes including simplicity, compactness, cost, efficiency and reliability.

SUMMARY OF THE INVENTION

The present invention meets the above-stated needs as well as others by providing a drinking vessel with an impact-responsive indicator circuit including an inertial switch having a stationary contact and a movable contact, the movable contact including a conductive spring member, the indicator circuit further including an indicator and a signal generator responsive to the inertial switch and having an output connected to the indicator.

According to another aspect of the invention, a drinking vessel contains an indicator activated by a direction-sensitive inertial switch. An impact-responsive indicator circuit contained within the drinking vessel includes an inertial switch having a stationary contact and a movable contact, the inertial switch having greater sensitivity to force applied axially to the bottom of the drinking vessel than to force applied in other directions, whereby the indicator circuit is particularly responsive to downward impact of the drinking vessel in an upright position. The indicator circuit further includes an indicator and a signal generator responsive to the inertial switch and having an output connected to the indicator.

As another aspect of the invention, a shot glass contains an impact-responsive indicator circuit in a small compartment within a hollow base, the indicator circuit including a low-profile inertial switch having a stationary contact and a cantilevered spring contact which has a longitudinal axis perpendicular to the longitudinal axis of the shot glass, the indicator circuit further including an indicator and a signal generator responsive to the inertial switch and having an output connected to the indicator.

According to another aspect of the invention, a drinking vessel contains an impact-responsive indicator circuit including a caseless inertial switch consisting of a stationary contact and a movable contact both mounted directly to a surface of a printed circuit board on which are also mounted an indicator and a signal generator responsive to the inertial switch and having an output connected to the indicator.

BRIEF DESCRIPTION OF THE DRAWINGS

FIG. 1 is a side view of one embodiment of a shot glass with indicator activated by inertial switch according to the present invention, with the shot glass shown in cross-section.

FIG. 2 is an exploded view of the shot glass of FIG. 1.

FIG. 6 is a cross-sectional side view of the base member of an embodiment of a shot glass with a sound generator activated by an inertial switch according to the present invention.

FIG. 7 illustrates the base member of FIG. 6 with the sound generator circuit contained therein.

FIG. 8 is a bottom view of the base member of FIG. 6.

FIG. 9 is an electrical schematic of the sound generator circuit of FIG. 7.

DETAILED DESCRIPTION OF THE PREFERRED EMBODIMENT

Figure 3:
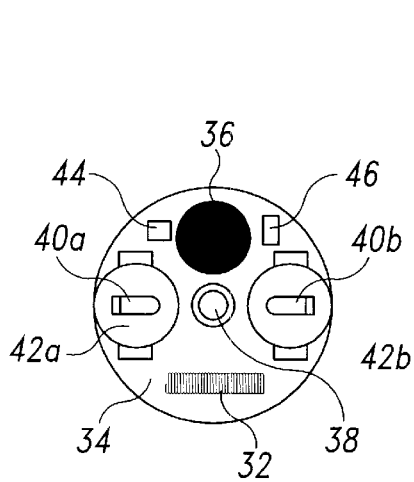
FIG. 3 is a top view of the printed circuit board shown in FIGS. 1 and 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring to FIG. 1 as well as to the exploded view of FIG. 2, one embodiment of the present invention is a blinking or flashing shot glass 10 that includes a main body 12 and a base member 14 which are molded separately and which enclose an impact-responsive indicator circuit 16. Base member 14 cooperates with an upper wall 18 and a side wall 20 integrally formed on the main body to form a hollow base. Walls 18 and 20, together with a side wall 22 and a bottom wall 24 of base member 14, define a compartment 26 for the indicator circuit. Main body 12 is frustoconical and base member 14 is generally cylindrical as illustrated, but either one may have either shape. The main body and base member are both preferably molded of high-impact polystyrene. Further details on a shot glass of the type described above may be found in U.S. Pat. No. 5,772,065 to Kalamaras, which patent is hereby incorporated by reference.

The fully assembled shot glass of FIG. 1 has an overall height of 55–60 mm. As shown in the drawing, the floor of compartment 26 is 1.5 mm below the bottom edge 28 of side wall 20, and the ceiling is 9.5 mm above edge 28, for a total inside height of 11 mm. Although these are the preferred dimensions, it will be understood that some variation thereof is contemplated for any given size of shot glass and that other sizes of shot glasses are contemplated. Indicator circuit 16 in the disclosed embodiment has an overall height of about 8 mm.

The separately molded parts of the shot glass may be adhesively bonded together but are preferably attached by means of a snap-fit connection. In one form of snap-fit connection, the inner surface of side wall 20 is provided with an annular projection or ridge and the outer surface of side wall 22 is provided with a corresponding annular groove, or vice versa. The projection may extend completely or partially around the circumference of the side wall, and in the latter case there may be a set of circumferentially spaced projections. Alternatively, the mating side wall surfaces may both be provided with annular projections adapted to momentarily compress or bend each other as one is forced over the other to snap the two parts of the shot glass together. As another alternative, a set of circumferentially spaced interlocking projections may be provided on each side wall and arranged such that the respective projections in each set are offset from each other circumferentially for insertion of the base member into the main body and then rotated with respect to each other to achieve mutual locking engagement. Although not preferred, the base members may alternatively be joined by ultrasonic welding, in which case energy-directing beads may be required on the mating surfaces as described in the above-referenced U.S. Pat. No. 5,772,065.

Figure 4:
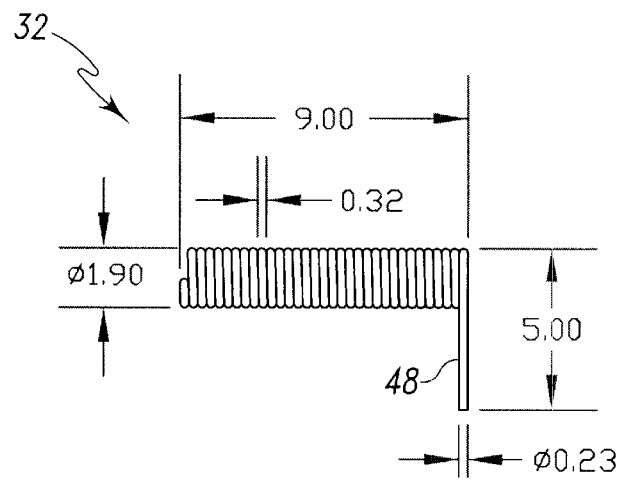
FIG. 4 is a side view of the coil spring in the inertial switch in the shot glass of FIGS. 1 and 2.
Figure 5:
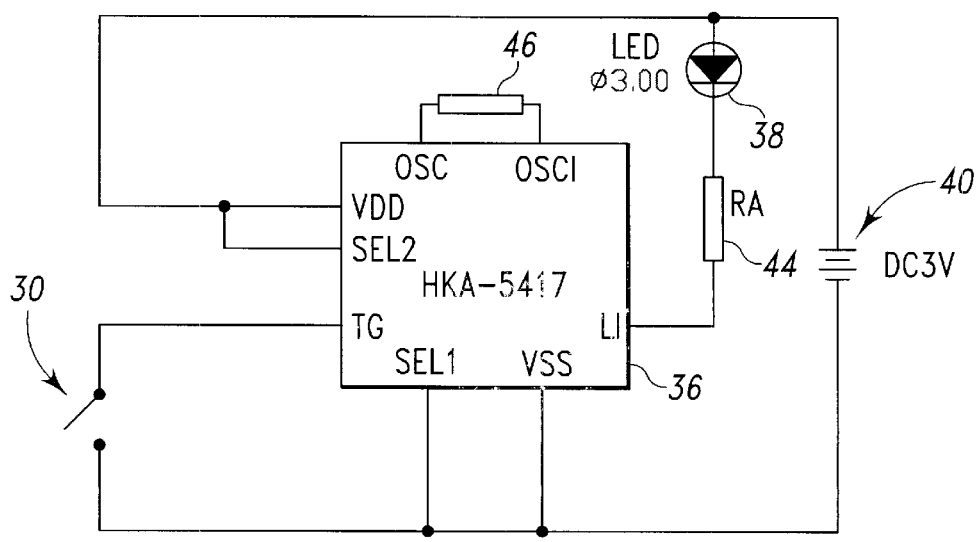
FIG. 5 is an electrical schematic of the flasher circuit in the shot glass of FIGS. 1 and 2.

Referring now also to FIGS. 3–5, the indicator circuit in the illustrated embodiment is a flasher circuit and includes a low-profile inertial switch 30 having a cantilevered coil spring contact 32 directly mounted on a printed circuit (pc) board 34 and oriented with the longitudinal axis of the coil spring parallel to the plane of the pc board and perpendicular to the longitudinal axis of the shot glass. The flasher circuit includes inertial switch 30, an integrated circuit (IC) 36, an LED 38, two button cells 40a,b in respective battery holders 42a,b, and associated resistors 44 and 46, all interconnected as shown in FIG. 3 and all mounted on the circuit board, which may be secured to lower wall 24 by double-backed tape. Suitable dimensions for the pc board are 0.8 mm thickness and 23 mm diameter. The inertial switch as shown is a normally open switch, and IC 36 is triggered by closure of the switch to supply a flashing signal to the LED. The IC preferably operates in one-shot mode, whereby it continues to generate an output signal once triggered by the switch, and preferably generates a train of pulses in response to a trigger pulse from the switch.

Movable contact 32 preferably includes a coil spring formed of 0.23 mm steel spring wire and having an outer diameter of approximately 1.90 mm and an axial length of approximately 9 mm as shown in FIG. 4, in which all dimensions specified are in millimeters. The contact includes a lead 48 which is perpendicular to the longitudinal axis of the coil spring and which is affixed directly to the board by means of a conventional solder connection. The coil spring is suspended over a stationary contact (not shown) on the board with a preferred gap of 0.4 mm±0.1 mm between the two contacts. The coil spring contact is direction-sensitive and, oriented as shown, has its greatest sensitivity to force applied axially to the bottom of the shot glass. In other words, the inertial switch is particularly sensitive to downward vertical deceleration of the shot glass as typically occurs when the glass is set down in an upright position on a table or bar surface. The gap is set to achieve a desired sensitivity or impact response threshold. With the coil spring as disclosed, the coil spring contact deflects 0.4 mm and thereby closes the switch in response to an actuation force of about 0.5 grams, corresponding approximately to the force experienced upon impact of the shot glass on a rigid surface when dropped from a height of approximately 5 inches. The response theshold may be set to a higher or lower value corresponding to a vertical drop in the range of 0.5–10" or beyond in certain applications, but the values specified above are most preferred.

The IC is preferably supplied in die form and wire bonded to the upper surface of the circuit board. A suitable IC for the flasher circuit is type HKA-5417, also identified as A5417, commercially available from Hua Ko Electronics Co. Ltd., Hong Kong. The IC generates a pulse train of 38 pulses each time it is triggered, at a rate and with a pulse width controlled by timing resistor 46. With a timing resistor value of 510 KΩ, the IC generates approximately 2 pulses per second with a pulse width of approximately 100 milliseconds. Proportionately different pulse widths and rates may be obtained if desired by selecting a different value for resistor 46. A suitable LED is a high-brightness LED, type HLMPQ105 from Hewlett Packard, with an optional series resistor 44 which may have a value of 33Ω. The visual effect may be enhanced, if desired, with an upwardly oriented parabolic or otherwise curved reflector around the LED.

Button cells 40a,b are 1.5V AG3 button cells and are connected in series so as to provide a 3V DC source. Such button cells are commercially available from Chung Pak Battery Works Ltd., Hong Kong, among other suppliers. Each battery, and thus the series connection of the two cells, preferably has a capacity of 20–50 mA-hr, most preferably in the range of 20–25 mA-hr, although batteries of less than 20 ma-hr and more than 50 ma-hr may be suitable for some applications.

An alternative circuit configuration suitable for certain applications including larger drinking vessels such as tumblers is disclosed in copending U.S. patent application Ser. No. 08/730,597 and is incorporated herein by reference. In addition, the invention may alternatively be embodied in plastic mugs and miniature martini glasses.

Referring now to FIGS. 6–9, a second embodiment of the present invention employs a sound module in the impact-responsive indicator circuit. An extended base member 50 includes an upper rim section 52 designed to fit entirely within main body 12 of FIG. 2, and has a depth of 11 mm below the rim section as shown in FIG. 6. Thus, the inside height of the compartment in the hollow base formed by base member 50 and main body 12, including the above-referenced dimension of 9.5 mm, is 20.5 mm. The compartment contains a printed circuit board 54 having mounted thereon an inertial switch 56, a sound generator IC 58, an oscillator resistor ($R_{osc}$) 60, and three button cells 62 connected in series, and also contains a speaker 64 connected by electrical wires to the sound generator IC on the circuit board. A preferred circuit schematic is shown in FIG. 9.

The pc board and inertial switch may be the same as that shown and described above. A suitable sound chip is type AMA032A, a 3-second voice chip, commercially available from Alpha Microelectronics Corporation, Taiwan. The Alpha AMA140A voice chip, providing 14 seconds of sound, is also suitable. A suitable speaker is a 27 mm×7 mm 32Ω speaker, one source of which is AI Goodwell Industries Ltd., Hong Kong. A value of 180 KΩ is suitable for resistor 60, although a different value may be used for different sounds, and the button cell may be, for example, type AG10 or AG13. The sound module may generate a simple tone or melody or, if desired, may be programmed to reproduce a prerecorded message such as an advertising message to complement, or substitute for, visible advertising indicia provided on the surface of the shot glass or other drinking vessel.

Base member 50 includes a number of holes 65 through the bottom wall thereof to allow sound to escape, as shown in FIG. 8, and preferably also includes a number of inverted U-shaped holes or "mouse holes" (not shown) in the bottom edge of the side wall thereof to allow sound to escape even when the shot glass is resting on a flat surface. The side wall of the base member is preferably extended several millimeters in length for this purpose.

FIG. 8 also shows a slot 66 for a pull tab (not shown) that is advantageously employed as an insulator between the contacts of the inertial switch to avoid unwanted battery discharge, such as during transportation of the shot glass. More specifically, the pull tab may be a strip of mylar or plastic film, which may be, for example, approximately 0.1–0.2 mm thick, approximately 4 mm wide and up to 40 mm long. The pull tab is sized primarily to prevent the coil spring contact from engaging the stationary contact. The base member is oriented such that the slot is vertically aligned with the coil spring contact, and the pull tab may be placed between the two contacts in a direction perpendicular to the axis of the coil spring, extending therefrom to the edge of the Pc board and then downwardly, around the edge of the speaker, through the slot. The pull tab is so positioned during assembly of the shot glass and then pulled out of the shot glass when desired to allow operation thereof. A pull tab is likewise contemplated for the first embodiment described above.

While described above as a normally open switch, the inertial switch may alternatively be configured as a normally closed switch, although such a configuration is less desirable because of an associated constant current drain. A cantilevered coil spring contact may be directly mounted on the pc board and oriented as described above, and a stationary contact may be located above the spring contact and normally in contact therewith. For example, a conductive standoff or post with a horizontal upper bar, e.g., an inverted L-shaped post, may serve as the stationary contact. The coil spring contact deflects away from the underside of the bar and thereby opens the switch in response to downward impact of the drinking vessel in an upright position.

The bar may be a thin rod and may alternatively be mounted at a height such that it extends into the open end of the coil spring, either along the axis thereof (normally open switch) or normally in contact with the bottom inside surface thereof (normally closed switch). The first of these embodiments with a rod extending inside the coil spring is not direction-sensitive and is less desirable than other embodiments for that reason among others, but it may be useful in some applications where direction-sensitive response is not required.

In another alternative embodiment of a normally open switch, the movable contact of the inertial switch is a vertically oriented extensible spring member, e.g., a coil spring oriented with its longitudinal axis perpendicular to the plane of the pc board. The spring in this embodiment is suspended from the underside of the bar of an inverted L-shaped post as described above and sized so as to normally provide a desired gap between the free end of the spring and a stationary contact vertically aligned therewith on the board surface. The spring constant is selected such that the spring extends into contact with the stationary contact in response to downward impact above a desired threshold.

A vertically oriented spring may also serve as the movable contact of a normally closed switch. For example, a compression spring may have one end affixed to the board surface and the other end normally in contact with the underside of the bar of an inverted L-shaped post of the type described above. The spring constant is selected such that the spring breaks contact with the stationary contact in response to downward impact above a desired threshold.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:
1. An illuminated drinking vessel, comprising:
   a drinking vessel having a top and bottom and a longitudinal axis therethrough; and
   an impact-responsive indicator circuit contained within said drinking vessel, said indicator circuit including a direction-sensitive inertial switch having a stationary contact and a movable contact, said inertial switch having greater sensitivity to force applied axially to the bottom of said drinking vessel than to force applied in other directions, said indicator circuit further including an indicator and a signal generator responsive to said inertial switch and having an output connected to said indicator, whereby said indicator circuit is particularly responsive to downward impact of said drinking vessel in an upright position.

2. The drinking vessel of claim 1, wherein said movable contact includes a cantilevered spring member having a longitudinal axis perpendicular to the longitudinal axis of said drinking vessel.

3. The drinking vessel of claim 2, wherein said cantilevered spring contact includes a coil spring, and wherein said stationary contact is radially external to said coil spring and formed on only one side thereof.

4. A shot glass with indicator activated by a cantilever-type inertial switch, comprising:

a shot glass having a body and a hollow base, said base having upper and lower walls and a side wall together defining a compartment having a maximum interior height of less than 15 mm, and an impact-responsive indicator circuit contained within said compartment, said indicator circuit including a low-profile, direction-sensitive inertial switch, an indicator, and a signal generator responsive to said inertial switch and having an output connected to said indicator, said inertial switch having a stationary contact and a cantilevered spring contact, said cantilevered spring contact having a longitudinal axis perpendicular to the longitudinal axis of said shot glass and having a maximum height within said compartment of less than 5 mm.

5. The shot glass of claim 4, wherein said indicator circuit further includes a printed circuit board having said inertial switch and said signal generator mounted thereon with said stationary and cantilevered spring contacts directly mounted on a surface of said board.

6. The shot glass of claim 5, wherein said cantilevered spring contact includes a coil spring with a diameter less than 4 mm suspended over said stationary contact with a gap therebetween in the range of 0.1–1.0 mm.

7. The shot glass of claim 6, wherein said coil spring comprises steel spring wire having a diameter of less than 0.3 mm and has a length in the range of 6–12 mm.

8. The shot glass of claim 5, wherein said coil spring has sufficient flexibility to deflect across said gap in response to impact of said shot glass when dropped in an upright position from a height in the range of 0.5–10 inches above a rigid surface.

9. The shot glass of claim 8, wherein said coil spring has sufficient flexibility to deflect across said gap in response to impact of said shot glass when dropped in an upright position from a height of approximately 5 inches above a rigid surface.

10. The shot glass of claim 5, wherein said inertial switch has a threshold actuation force of approximately 0.5 grams.

11. An illuminated drinking vessel, comprising:

a drinking vessel; and an impact-responsive indicator circuit contained within said drinking vessel, said indicator circuit including an inertial switch, an indicator, a signal generator responsive to said inertial switch and having an output connected to said indicator, and a printed circuit board having said inertial switch and signal generator mounted thereon, wherein said inertial switch is a caseless switch consisting of a stationary contact and a movable contact both mounted directly to a surface of said board.

12. The drinking vessel of claim 11, wherein said movable contact of said inertial switch includes a cantilevered spring member having a fixed end and a free end, said free end suspended over said stationary contact in a normally open switch configuration.

13. The drinking vessel of claim 12, wherein said fixed end of said cantilevered spring member is affixed directly to said board, and wherein said spring member has a longitudinal axis parallel to said board surface.

14. The drinking vessel of claim 13, wherein said spring member is a coil spring.

15. The drinking vessel of claim 12, wherein said spring member is a coil spring.

* * * * *

UNITED STATES PATENT AND TRADEMARK OFFICE
CERTIFICATE OF CORRECTION

PATENT NO.    : 6,419,384 B1
DATED         : July 16, 2002
INVENTOR(S)   : Edward D. Lewis et al.

It is certified that error appears in the above-identified patent and that said Letters Patent is hereby corrected as shown below:

<u>Title page,</u>
Item [75], Inventors, please insert the Assignee as follows:
-- [73]   Assignee:    Buztronics, Inc. Indianapolis, (IN) --
ABSTRACT,
Line 8, after the word "switch", please delete ", an" and insert -- and connected to the --.

<u>Column 1,</u>
Line 32, after the word "as", please delete ",".

<u>Column 5,</u>
Line 67, please change "Pc" to -- pc --.

<u>Column 8,</u>
Line 4, please change "5" to -- 6 --.

Signed and Sealed this

Twenty-fourth Day of December, 2002

JAMES E. ROGAN
*Director of the United States Patent and Trademark Office*